L. C. SCHERMERHORN.
AUTOMOBILE LOCKING DEVICE.
APPLICATION FILED OCT. 31, 1916.
1,223,906.
Patented Apr. 24, 1917.
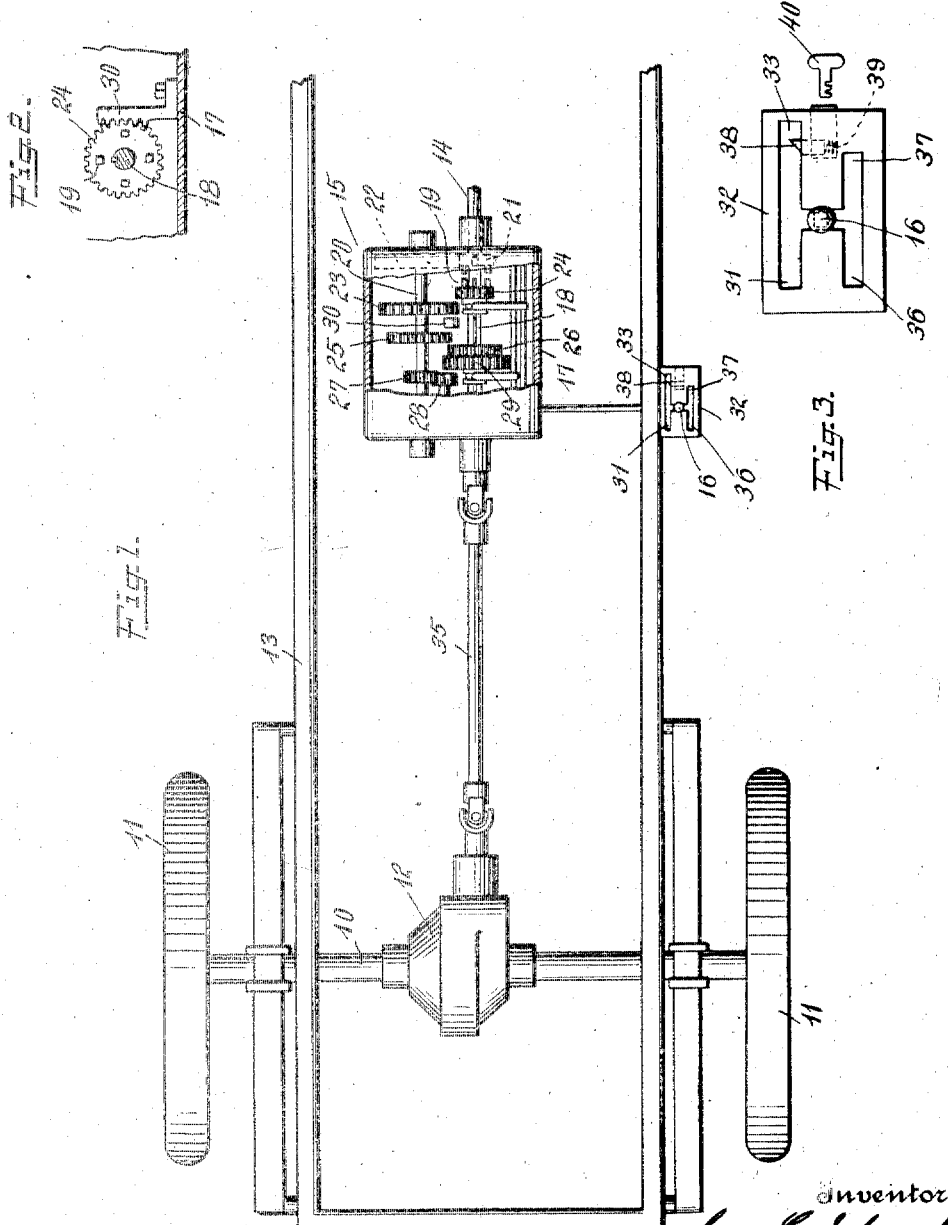
Inventor
Louis C. Schermerhorn
By his Attorney
E. W. Marshall

UNITED STATES PATENT OFFICE.

LOUIS C. SCHERMERHORN, OF PATERSON, NEW JERSEY.

AUTOMOBILE-LOCKING DEVICE.

1,223,906.  Specification of Letters Patent.  Patented Apr. 24, 1917.

Application filed October 31, 1916. Serial No. 128,669.

*To all whom it may concern:*

Be it known that I, LOUIS C. SCHERMERHORN, a citizen of the United States, and a resident of Paterson, Passaic county, and State of New Jersey, have invented certain new and useful Improvements in Automobile-Locking Devices, of which the following is a specification, reference being had to the accompanying drawings, forming a part thereof.

My invention relates to means for securing motor driven apparatus against unauthorized starting and running, and has special reference to locks for automobiles and other devices having change gear transmission mechanism.

One object of my invention is to provide a simple and durable lock which shall be adapted not only to prevent the manipulation of the gear shifting lever, but also to lock the transmission gears and driving wheels.

In order that my invention may be thoroughly understood I will now proceed to describe the same in the following specification, and then point out the novel features thereof in appended claims.

Referring to the drawings:

Figure 1 is a diagrammatic plan view of the chassis of a motor vehicle which embodies my invention, the engine and front wheels being omitted and the transmission casing being broken away and shown in section.

Fig. 2 is a detail view showing the transmission locking segment in elevation.

Fig. 3 is a plan view on a larger scale, of the transmission control lever and its slotted guide block showing the lever catch and lock.

In Fig. 1 the chassis illustrated comprises a rear axle 10, driving wheels 11, differential gearing 12, a frame 13, an engine shaft 14, a transmission mechanism 15 and a control lever 16 therefor.

The transmission mechanism comprises a casing 17, a direct transmission 18, a clutch 19, a countershaft 20, speed reducing gears 21—22 between the engine shaft 14 and the countershaft 20, and a plurality of change gears.

Secured to the countershaft 20 is an intermediate speed gear 23 which is adapted to mesh with a gear 24 which forms a part of the clutch 19 and is slidably mounted on the shaft 18; a low speed gear 25 which is adapted to mesh with the gear 26 and a reverse gear 27 which is adapted to be connected through an auxiliary gear 28 to a gear 29. The gears 26 and 29 constitute one unit and are slidably mounted on the shaft 18 in a well known manner.

Adjacent to the intermediate speed gear 23 is a stationary gear segment 30 which is adapted to mesh with the gear 24 when the control lever occupies one position as hereinafter explained, and to lock the gear 24 together with the gear 23 with which the latter is also in mesh.

The clutch member 19 is adapted to be closed when the lever 16 is thrown into one branch 31 of the slotted guide block 32 and when the control lever is thrown in the opposite direction into the branch 33 the clutch 19 is released and the gear 24 meshes with the gear 23. When the clutch is set the engine shaft is connected directly to the transmission shaft 18 which is coupled to the differential mechanism by a shaft 35. When the gear 24 meshes with the gear 23 the engine shaft is connected through gears 21 and 22, 23 and 24 to the transmission shaft. By this means the transmission shaft and the rear axle are driven at intermediate speed.

If the control lever is shifted to the other side of the H-shaped slot in the block 32, it may be thrown either into one branch 36 in which the gears 25 and 26 are in mesh, or into the opposite branch 37 in which the reversing gears 28 and 29 are in mesh.

The branch 33 of the guide slot is longer than the others and has a latch 38 as clearly shown in Fig. 3. This latch is adapted to be cammed back by the action of the lever in opposition to springs 39 and permits the lever to enter the bottom of the slot. It does however, prevent the accidental movement of the lever to the bottom of the slot by accentuating this position and requiring additional force to overcome the springs 39 and set the lever.

On this account there is no likelihood of the transmission control lever being thrown to the bottom of the slot accidentally. The lever is manipulated in the usual way for controlling the vehicle and when the machine is brought to rest and the engine stopped, the driving wheels as well as the transmission gearing may be positively locked against rotative movement by throwing the control lever 16 to the bottom of slot branch 33. The latch 38 springs out behind it and positively holds it in position. Furthermore, it cannot be released to govern the transmission gears, until a key such as the key 40 of Fig. 3, has been utilized for throwing back the latch.

When the lever is thrown to the bottom of the slot branch 33, the clutch member 19 is so adjusted that the gear 24 moves partially out of mesh with the gear 23 and partially into mesh with the stationary gear segment 30. In this position it is obviously impossible to turn the transmission shaft 18 on which the gear 24 is splined, or the shaft 20 to which the gear 23 is secured. In other words, it is impossible to either control the transmission or start the vehicle.

Attention is directed to the fact that the incorporation of my invention in a transmission mechanism of well known type, involves only comparatively slight changes to be made and it does nevertheless lock the control lever so that it cannot be shifted and the transmission gearing so that the rear axle or driving wheels cannot be turned without releasing the lever. Consequently, the owner or driver of the vehicle may safely leave his car since no one can start or run it unless he is provided with a key for releasing the latch in the manner already explained.

In order to more securely lock both transmission shafts I prefer that the gear 24 be wide enough to completely overlap both the gear 23 and the stationary segment 30.

It is evident that variations may be effected within the spirit and scope of my invention, and I intend that only such limitations be imposed as are indicated in the appended claims.

What I claim is:

1. Transmission gearing comprising an axially adjustable gear, a relatively fixed gear adapted to coöperate therewith in one position, and a rigid segment adapted to engage the adjustable gear in a second position thereof to thereby lock said gearing against rotation.

2. Transmission gearing comprising a direct transmission shaft, a countershaft, coöperating gears on the respective shafts, comprising an axially adjustable gear, stationary means for engaging said adjustable gear, means for axially adjusting said adjustable gear to throw it into and out of mesh with its coöperating gear, and into engagement with said stationary means to lock the adjustable gear against rotation.

3. Transmission gearing comprising a direct transmission shaft, a countershaft, coöperating gears on the respective shafts, means for axially adjusting one of the gears to throw it into and out of mesh with its coöperating gear, and means adjacent to the coöperating fixed gear for locking the adjustable gear against rotation.

4. Transmission gearing comprising a direct transmission shaft, a countershaft, coöperating gears on the respective shafts, means for axially adjusting one of the gears to throw it into and out of mesh with its coöperating gear, and a stationary gear segment adjacent to the fixed gear and adapted to be engaged by the adjustable gear for locking same.

5. Transmission gearing comprising a direct transmission shaft, a countershaft, coöperating gears on the respective shafts, means for axially adjusting one of the gears to throw it into and out of mesh with its coöperating gear, and a stationary segment adjacent to the gear, and means for moving the adjustable gear into mesh with the fixed gear and the stationary segment to lock the shafts.

6. A transmission gearing comprising a relatively fixed gear, an adjustable gear adapted to coöperate therewith, and a stationary gear segment adapted to mesh with the adjustable gear in one position, a control lever for determining the position of the adjustable gear and a latch for locking the control lever in the position corresponding to the locked position of the adjustable gear.

7. A transmission gearing comprising an adjustable gear, a relatively fixed gear, a stationary segment adjacent to the fixed gear, and means for shifting the adjustable gear into mesh with either the fixed gear alone or both the fixed gear and the stationary segment.

In witness whereof, I have hereunto set my hand this 21st day of October, 1916.

LOUIS C. SCHERMERHORN.